United States Patent
Wu et al.

(10) Patent No.: US 9,971,189 B2
(45) Date of Patent: May 15, 2018

(54) DISPLAY COLOR OF A DISPLAY PANEL AND DISPLAY DEVICE HAVING A COLOR FILTER SUBSTRATE WITH QUANTUM DOTS AND BLACK MATRIX

(71) Applicants: BOE TECHNOLOGY GROUP CO., LTD., Beijing (CN); BEIJING BOE DISPLAY TECHNOLOGY CO., LTD., Beijing (CN)

(72) Inventors: Jun Wu, Beijing (CN); Hongming Zhan, Beijing (CN); Chao Tian, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 48 days.

(21) Appl. No.: 14/361,069

(22) PCT Filed: Dec. 11, 2013

(86) PCT No.: PCT/CN2013/089139
§ 371 (c)(1),
(2) Date: May 28, 2014

(87) PCT Pub. No.: WO2014/173137
PCT Pub. Date: Oct. 30, 2014

(65) Prior Publication Data
US 2015/0309359 A1    Oct. 29, 2015

(30) Foreign Application Priority Data
Apr. 22, 2013   (CN) .......................... 2013 1 0140354

(51) Int. Cl.
| | | |
|---|---|---|
| *G02F 1/1335* | (2006.01) | |
| *G02B 5/20* | (2006.01) | |
| *G02B 5/23* | (2006.01) | |

(52) U.S. Cl.
CPC ........ *G02F 1/133514* (2013.01); *G02B 5/201* (2013.01); *G02F 1/133512* (2013.01); *G02B 5/23* (2013.01); *G02F 2202/36* (2013.01)

(58) Field of Classification Search
CPC ...... G02B 26/008; G02B 7/006; G02B 5/201; G02B 5/223; G02B 5/23; G02F 1/133514; G02F 1/133512; G02F 2202/36
(Continued)

(56) References Cited

U.S. PATENT DOCUMENTS 5,948,592  A  *  9/1999  Umehara ............... G03F 7/04
                                                          430/197
2008/0036367 A1    2/2008  Eida et al.
(Continued)

FOREIGN PATENT DOCUMENTS

| CN | 1969595 A | 5/2007 |
|---|---|---|
| CN | 102044552 A | 5/2011 |

(Continued)

OTHER PUBLICATIONS

International Search Report dated Nov. 3, 2014; PCT/CN2013/089139.
(Continued)

*Primary Examiner* — Bumsuk Won
*Assistant Examiner* — Henry Duong
(74) *Attorney, Agent, or Firm* — Ladas & Parry LLP

(57) ABSTRACT

The disclosure discloses a color filter substrate, a display panel and a display device. The display panel includes a plurality of pixels, each of which includes a plurality of sub-pixels of various colors. The color filter substrate
(Continued)

includes a base substrate, a plurality of black matrixes formed on the base substrate, a plurality of opening regions disposed between the back matrixes and corresponding to the sub-pixels in a one-to-one correspondence relationship, and a color filter layer filled in each of the opening regions; the color filter layer is doped with quantum dots which can generate light after excited, color of which is the same as the color of the corresponding sub-pixels. The color filter substrate improves purity of light transmitted through the color filter layer and in turn improves display color gamut of the display device.

7 Claims, 1 Drawing Sheet

(58) Field of Classification Search
USPC ........ 359/885, 890, 891, 892; 349/104, 105, 349/108, 110, 111; 345/55, 60, 65, 72; 313/483, 498, 499, 500, 501, 502, 503, 313/504, 506, 510
See application file for complete search history.

(56) References Cited

U.S. PATENT DOCUMENTS

| 2009/0102352 | A1* | 4/2009 | Cok | H05B 33/22 |
| | | | | 313/498 |
| 2011/0089809 | A1* | 4/2011 | Noh | B82Y 20/00 |
| | | | | 313/483 |
| 2012/0113671 | A1* | 5/2012 | Sadasivan | C09D 11/101 |
| | | | | 362/602 |
| 2012/0147468 | A1* | 6/2012 | Bell | G02B 5/201 |
| | | | | 359/491.01 |
| 2012/0300323 | A1* | 11/2012 | Matsui | G02B 5/201 |
| | | | | 359/885 |
| 2013/0010229 | A1* | 1/2013 | Shin | G02F 1/1336 |
| | | | | 349/62 |
| 2014/0021368 | A1* | 1/2014 | Chakravarthy | C03C 4/12 |
| | | | | 250/459.1 |

FOREIGN PATENT DOCUMENTS

| CN | 102866535 | A |   | 8/2013 |
| CN | 103235442 | A |   | 8/2013 |
| KR | 20070094679 | A |   | 9/2007 |
| KR | 20100089749 | A | * | 8/2010 |
| TW | 201213980 | A |   | 4/2012 |

OTHER PUBLICATIONS

First Chinese Office Action dated Feb. 10, 2015; Appln. No. 201310140354.1.
International Preliminary Report on Patentability dated Oct. 27, 2015; PCT/CN2013/089139.
Third Chinese Office Action dated Jan. 14, 2016; Appln. No. 201310140354.1
Second Chinese Appln. No. 201310140354.1; Dated Jul. 17, 2015.
Second Chinese Office Action Appln. No. 201310400101.3; dated Jul. 20, 2015.

* cited by examiner

DISPLAY COLOR OF A DISPLAY PANEL AND DISPLAY DEVICE HAVING A COLOR FILTER SUBSTRATE WITH QUANTUM DOTS AND BLACK MATRIX

TECHNICAL FIELD

Embodiments of the present disclosure relate to a color filter substrate, a display panel and a display device.

BACKGROUND

With the continuous development of science and technology, the liquid crystal display technology is increasingly improved, and a liquid crystal display product is widely used in our lives and the performance of the liquid crystal display is required to more and more excellent.

As illustrated in FIG. 1, a current color filter substrate comprises a base substrate 11, a color filter layer 12 disposed on the base substrate 11 and a black matrix 13. The color filter substrate is applied to a display device, in which a backlight source is commonly a white backlight and the white backlight comprises mixing light of blue light and yellow light, and thus, a color is not pure, and after the white backlight is transmitted through color filters of R, G and B three primary colors in the color filter layer 12 of the color filter substrate, obtained single color light may comprise other color light other than a desired color light, which causes a low display color gamut and color distortion.

SUMMARY

Embodiments of the disclosure provide a color filter substrate, which improves purity of light exiting from a color filter layer and in turn improves display color gamut of a display device.

Embodiments of the present disclosure further provide a display panel and a display device, which have high luminance and good display effect.

One aspect, an embodiment of the present disclosure provide a color filter substrate used for a display panel, the display panel comprising a plurality of pixels, each of which has a plurality of sub-pixels of various colors, and the color filter substrate comprises: a base substrate; a plurality of black matrixes, formed on the base substrate; a plurality of opening regions, disposed between the plurality of black matrixes and corresponding to the sub-pixels in a one-to-one correspondence relationship; and a color filter layer, filled in each of the opening regions. Herein quantum dots are doped in the color filter layer, and after excited, the quantum dots emit light of a color which is the same as a color of the corresponding sub-pixel.

According to one embodiment of the disclosure, materials for the quantum dots comprise at least one of gallium arsenide (GaAs), indium phosphide (InP), zinc sulfide (ZnS), cadmium sulfide (CdS), or cadmium selenide (CdSe).

According to one embodiment of the disclosure, the color filter layer comprises a red region (R), a green region (G) and a blue region (B), the quantum dots are made of cadmium selenide, the quantum dots in the red region (R) of the color filter layer have sizes in a range of 3 nm to 3.5 nm, the quantum dots in the green region (G) of the color filter layer have sizes in a range of 2 nm to 3 nm, and the quantum dots in the blue region (B) of the color filter layer have sizes in a range of 1.5 nm to 2 nm.

According to one embodiment of the disclosure, the quantum dots are of core-shell type, the core of the core-shell type quantum dots is made of cadmium selenide and the shell of the quantum dots is made of zinc sulfide or cadmium sulfide; or the core of the core-shell type quantum dots is made of indium phosphide and the shell of the core-shell type quantum dots is made of tin sulfide.

Optionally, the core of the quantum dots is made of cadmium selenide and the shell of the quantum dots is made of cadmium sulfide, the quantum dots in the red region of the color filter layer have sizes in a range of 3.2 nm to 3.9 nm, the quantum dots in the green region of the color filter layer have sizes in a range of 2.2 nm to 3.2 nm, and the quantum dots in the blue region of the color filter layer have sizes in a range of 1.7 nm to 2.2 nm.

According to one embodiment of the disclosure, the quantum dots are core-shell type quantum dots with a dual shell structure having a core, an inner shell and an outer shell, the core is made of cadmium selenide, the inner shell is made of cadmium sulfide and the outer shell is made of zinc sulfide, the quantum dots in the red region of the color filter layer have sizes in a range of 4.3 nm to 4.9 nm, the quantum dots in the green region of the color filter layer have sizes in a range of 3.3 nm to 4.3 nm, and the quantum dots in the blue region of the color filter layer have sizes in a range of 2.8 nm to 3.3 nm.

The color filter layer further comprises color photoresist material. Depending on whether the color photoresist material is water-soluble or oil-soluble, materials for the quantum dots are selected as being water-soluble or oil-soluble.

For example, a mass percent of the quantum dots in the color filter layer is between 0 and 20%.

Embodiments of the disclosure further provide a display panel, comprising any one of the color filter substrates as described above.

Embodiments of the disclosure further provide a display device which comprises the display panel as described above.

The color filter substrate provided by embodiments of the disclosure is used for a display panel, the display panel comprising a plurality of pixels, each of which has a plurality of sub-pixels of various colors, and the color filter substrate comprises: a base substrate; a plurality of black matrixes, formed on the base substrate; a plurality of opening regions, disposed between the plurality of black matrixes and corresponding to the sub-pixels in a one-to-one correspondence relationship; and a color filter layer, filled in each of the opening regions. Herein quantum dots are doped in the color filter layer, and after excited, the quantum dots emit light of a color which is the same as a color of the corresponding sub-pixel.

The quantum dots refer to nanoparticles composed of a group II-VI element or a group III-V element, have sizes less than or proximate to the exciton Bohr radius (usually, its diameter is no more than 10 nm) and have obvious quantum effect. The quantum dot is generally considered as quasi zero-dimension material which is a semiconductor nanostructure capable of confining conduction band electrons, valence band holes and excitons in all three spatial directions.

If a size of the particle in the semiconductor nanostructure is decreased to be up to a certain value (usually less than 10 nm), an electronic energy level in the proximity of the metal Fermi level changes from a quasi continuous energy level to a discrete energy level. A energy gap between a energy level of a highest occupied molecular orbital and a energy level of a lowest unoccupied molecular orbital of the discrete energy levels of the semiconductor nanoparticle is widen, causing blue shift of absorption spectrum and fluorescence spectrum. Such phenomenon is called the quantum size effect.

The quantum side effect makes optoelectronic properties of the semiconductor quantum dot change significantly. The quantum size effect generated when a size of the semiconductor quantum dot particle is smaller than the Bohr radius of an exciton changes the energy level structure of semiconductor material from a continuous energy band structure to a discrete energy level structure with molecular properties. By taking advantage of such a phenomenon, semiconductor quantum dots with different particle sizes can be manufactured in the same one reaction, and thus, lights at different frequencies can be emitted and light of various colors can be generated conveniently.

Energy of photons absorbed by a solid is greater than energy of photons emitted by it, and thus, compared with an absorption spectrum, an emission spectrum will shift toward low energy (red shift) and a difference between the energies of the two photons is called Stokes shift. The quantum dot has a large Stokes shift. Another optical property of the quantum dot different from organic dye is the large Stokes shift. Thus, an overlapping of the emission spectrum and the excitation spectrum can be avoided, which facilitates detecting fluorescence signals.

The color filter substrate according to the embodiments of the disclosure is applied in a display device, and the quantum dots have a narrow emission spectrum and high emission efficiency due to the quantum size effect and the Stroke shift. The quantum dots in the color filter layer corresponding to the sub-pixel units of every color can absorb light emitted by the backlight source of the display device that has greater energy than that of light of the sub-pixel units of the color, and convert the absorbed light into a single color light corresponding to the color of the sub-pixel units and emit the single color light, such that light emitted from the color filter layer 13 corresponding to the sub-pixels of the color is more purer and has a higher saturation degree.

Therefore, the color filter substrate according to the embodiments of the present disclosure can improve purity of light emitted from the color filter layer and further improves the display color gamut of the display device.

The display panel and the display device comprising the above color filter substrate provided by embodiments of the present disclosure have high luminance and the good display effect.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

It should be noted that, in the display field, colors of a color filter layer are not limited to only comprise RGB (Red, Green and Blue) three primary colors, and may be combinations of other colors, such as Red, Green, Blue and White (RGBW), Red, Green, Blue and Yellow (RGBY), or Cyan, Magenta, Yellow or black (CMYK), and etc.

For purpose of convenience of description, the following embodiments are described by taking a model of the RGB three primary colors. But embodiments of the disclosure are not limited hereto.

A First Embodiment

Figure 1:
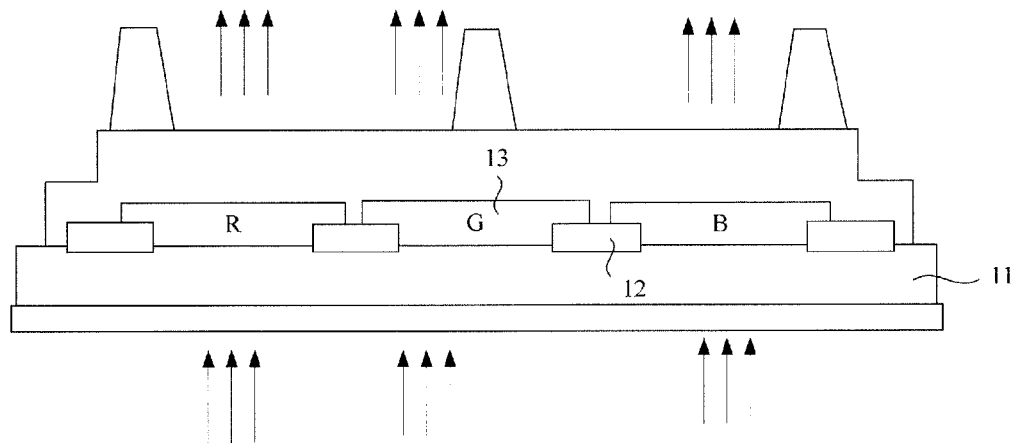
FIG. 1 is a schematic structure view of a color filter substrate in prior art.
Figure 2:
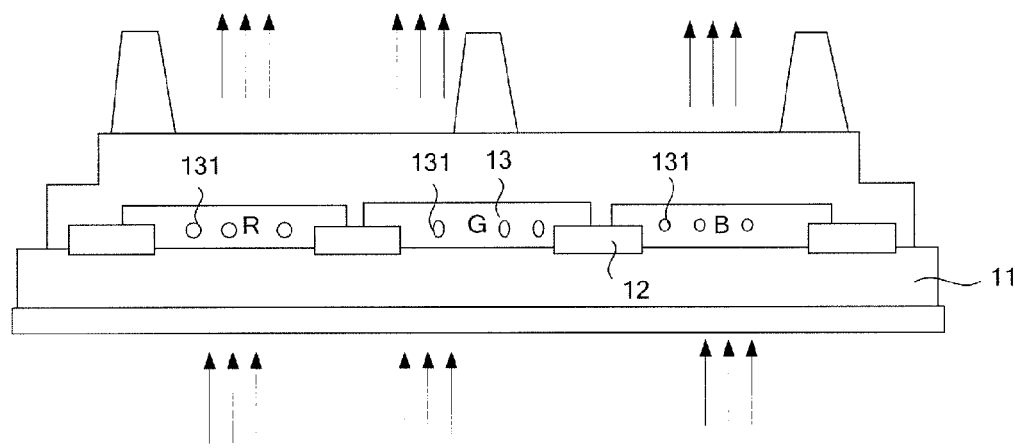
FIG. 2 is a schematic structure view of a color filter substrate according to an embodiment of the disclosure.

The first embodiment of the present disclosure provides a color filter substrate 1 used for a display panel. The display panel comprises a plurality of pixels, and each of the pixels comprises a plurality of sub-pixels of various colors. As illustrated in FIG. 2, the color filter substrate 1 comprises: a base substrate 11; a plurality of black matrixes 12, formed on the base substrate 11; a plurality of opening regions, provided between the black matrixes and corresponding to the plurality of sub-pixels in a one-to-one correspondence relationship; and a color filter layer 13, filled in each of the opening regions, wherein the color filter layer 13 is doped with quantum dots 13 which can generate light after excited, color of the generated light is the same as color of the corresponding sub-pixels.

The color filter layer 13 further comprises color photoresist material, and the quantum dots are doped in the color photoresist material. The color photoresist material usually comprises a coloring agent, an adhesive & cross-linking agent, a solvent and a photopolymerization initiator. The coloring agent can be an acid dye, a basic dye, a nonionic dye and the like. For example, a red acid dye comprises an azo acid dye, such as C.I. reactive red 120, a green acid dye comprises an azo acid dye such as C.I. direct green 59, and a blue acid dye comprises an anthraquinone series acid dye such as C.I. reactive blue 49. The adhesive & cross-linking agent comprises polymer material such as poly methyl methacrylate (PMMA), polyethylene glycol (PEG), with a polymerization degree in a range of 2 to 10. The solvent comprises acrylic acid, styrene, ethanol and the like, or a monomer of the adhesive. The photopolymerization initiator comprises acetophenone compounds, dizao compounds and the like, such as a benzophenone.

The quantum dots refer to nanoparticles composed of a group of II-VI element or a group of III-V element, have sizes less than or proximate to the exciton Bohr radius (usually, its diameter is no more than 10 nm) and have obvious quantum effect. The quantum dot is generally considered as quasi zero-dimension material which is a semiconductor nanostructure capable of confining conduction band electrons, valence band holes and excitons in all three spatial directions.

If a size of the particle in the semiconductor nanostructure is decreased to be up to a certain value (usually less than 10 nm), an electronic energy level in the proximity of the metal Fermi level changes from a quasi continuous energy level to a discrete energy level. A energy gap between a energy level of a highest occupied molecular orbital and a energy level of a lowest unoccupied molecular orbital of the discrete energy levels of the semiconductor nanoparticle is widen, causing blue shift of absorption spectrum and fluorescence spectrum. Such phenomenon is called the quantum size effect.

The quantum side effect makes optoelectronic properties of the semiconductor quantum dot change significantly. The quantum size effect generated when a size of the semiconductor quantum dot particle is smaller than the Bohr radius of an exciton changes the energy level structure of semiconductor material from a continuous energy band structure to a discrete energy level structure with molecular properties. By taking advantage of such a phenomenon, semiconductor quantum dots with different particle sizes can be manufactured in the same one reaction, and thus, lights at different frequencies can be emitted and light of various colors can be generated conveniently.

Energy of photons absorbed by a solid is greater than energy of photons emitted by it, and thus, compared with an absorption spectrum, an emission spectrum will shift toward low energy (red shift) and a difference between the energies of the two photons is called Stokes shift. The quantum dot has a large Stokes shift. Another optical property of the quantum dot different from organic dye is the large Stokes shift. Thus, an overlapping of the emission spectrum and the excitation spectrum can be avoided, which facilitates detecting fluorescence signals.

In an embodiment of the disclosure, the quantum dots are doped in the color filter layer, that is, doped in the color photoresist material. Depending on whether the color photoresist material is oil-soluble or water-soluble, material for the quantum dots is selected as being oil-soluble or water-soluble. In a condition that the color filter layer comprises the organic dye, an oil-soluble quantum dot is doped in the color filter layer; and in a condition that the color filter layer comprises an inorganic dye, a water-soluble quantum dot is doped in the color filter layer.

The color filter substrate according to the embodiments of the disclosure is applied in a display device, and the quantum dots 131 have a narrow emission spectrum and high emission efficiency due to the quantum size effect and the Stroke shift. The quantum dots in the color filter layer corresponding to the sub-pixel units of every color can absorb light emitted by the backlight source of the display device that has greater energy than that of light of the sub-pixel units of the color, and convert the absorbed light into a single color light corresponding to the color of the sub-pixel units and emit the single color light, such that light emitted form the color filter layer 13 corresponding to the sub-pixels of the color is purer and has a higher saturation degree.

Therefore, the color filter substrate according to the embodiments of the present disclosure can improve purity of light exiting from the color filter layer and further improves the display color gamut of the display device.

Further, materials for the quantum dots comprise at least one of GaAs, InP, ZnS, CdS or CdSe.

And further, for example, as illustrated in FIG. 2, the color filter layer 13 according to embodiments of the present disclosure has a red region R, a green region G and a blue region B corresponding to the R, G and B three primary colors, respectively, and if the quantum dots are made of CdSe, the quantum dots in the red region R of the color filter layer 13 have sizes in a range of 3 nm to 3.5 nm, the quantum dots in the green region G of the color filter layer 13 have sizes in a range of 2 nm to 3 nm, and the quantum dots in the blue region B of the color filter layer 13 have sizes in a range of 1.5 nm to 2 nm. That is to say, the quantum dots in the red region R, the green region G and the blue region B of the color filter layer 13 are different in sizes. Due to the quantum size effect and the Strokes shift of the quantum dots, the quantum dots 131 in the red region R can absorb portion of light emitted from the light source that has greater energy than red light and convert it into red light of single color and emit the converted red light such that the red light emitted from the red region R becomes purer; the quantum dots 131 in the green region G can absorb portion of light emitted from the light source that has greater energy than green light and convert it into green light of single color and emit the converted green light such that the green light emitted from the green region G becomes purer; and the quantum dots 131 in the blue region B can absorb portion of light emitted from the light source that has greater energy than blue light and convert it into blue light of single color and emit the converted blue light such that the blue light emitted from the blue region B becomes purer.

For example, materials for the quantum dots 131 according to the embodiments of the present disclosure are water-soluble or oil-soluble.

The quantum dots have various structures. For example, the quantum dots 131 are of core-shell type, the core of the core-shell type quantum dots is made of CdSe and the shell of the quantum dots is made of ZnS or CdS; or, the core of the core-shell type quantum dots is made of InP and the shell of the core-shell type quantum dots is made of tin sulfide.

The core-shell type quantum dots refer to quantum dots that have a core and a shell, wherein the shell surrounds the core.

If the core of the quantum dots is made of CdSe and the shell of the quantum dots is made of CdS, the quantum dots in the red region of the color filter layer have sizes in a range of 3.2 nm to 3.9 nm, the quantum dots in the green region of the color filter layer have sizes in a range of 2.2 nm to 3.2 nm, and the quantum dots in the blue region of the color filter layer have sizes in a range of 1.7 nm to 2.2 nm.

As a modified embodiment of the disclosure, the quantum dots are core-shell type quantum dots with a dual shell structure, i.e. each having a core, an inner shell and an outer shell. For example, the core is made of CdSe, the inner shell is made of CdS and the outer shell is made of ZnS. If the core-shell type quantum dots with the dual shell structure are used, the quantum dots in the red region of the color filter layer have sizes in a range of 4.3 nm to 4.9 nm, the quantum dots in the green region of the color filter layer have sizes in a range of 3.3 nm to 4.3 nm, and the quantum dots in the blue region of the color filter layer have sizes in a range of 2.8 nm to 3.3 nm.

For example, a mass percent of the quantum dots in the color filter layer is between 0 and 20% and below, such as 5%, 10%, 15%, 20% and the like. Description thereof will not be repeated here.

A Second Embodiment

The second embodiment of the present disclosure further provides a display panel, which comprises any one of the color filter substrates according to above-mentioned embodiments. Quantum dots are doped in the color filter layer of the color filter substrate, and the quantum dots make colors of light transmitted through the color regions of the color filter layer purer and further improve the luminance of the display panel, due to the quantum size effect and the Stokes shift effect.

The display panel according to the embodiments of the disclosure may be a liquid crystal display panel, an OLED (Organic Light Emitting Diode) display panel, or any other display panel that requires a color filter substrate.

A Third Embodiment

The third embodiment of the disclosure further provides a display device which comprises the display panel according to the second embodiment. As the display panel has a high luminance, the display device according to the embodiments of the disclosure has a good display effect.

The display device according to the embodiments of the disclosure may be any product or component which has a display function, such as an OLED (Organic Light Emitting Diode) display panel, a liquid crystal TV, a liquid crystal display, a digital photo frame, a cell phone, a tablet PC, and the like.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

The invention claimed is:

1. A color filter substrate used for a display panel, the display panel comprising a plurality of pixels, each of which has a plurality of sub-pixels of different colors, and
   the color filter substrate comprising:
      a base substrate;
      a plurality of black matrixes, formed on the base substrate;
      a plurality of opening regions, disposed between the plurality of black matrixes and corresponding to the sub-pixels in a one-to-one correspondence relationship; and
      a color filter layer, filled in each of the opening regions,
   wherein quantum dots are doped in the color filter layer, and after excited, the quantum dots emit light of a color which is the same as a color of the corresponding sub-pixel;
   wherein the quantum dots are of core-shell type, the core of the core-shell type quantum dots is made of cadmium selenide and the shell of the quantum dots is made of zinc sulfide or cadmium sulfide; or the core of the core-shell type quantum dots is made of indium phosphide and the shell of the core-shell type quantum dots of is made of tin sulfide;
   when assembled in the display panel and in operation light passes through the base substrate and then passes through the color filter layer; and
   wherein a mass percent of the quantum dots in the color filter layer is between 0 and 20%,
   wherein materials for the quantum dots is water-soluble or oil-soluble, the materials for the quantum dots are selected as being water-soluble or oil-soluble depending on whether the color filter layer is water-soluble or oil-soluble.

2. The color filter substrate according to claim 1, wherein the color filter layer comprises a red region (R), a green region (G) and a blue region (B), the quantum dots are made of cadmium selenide, the quantum dots in the red region (R) of the color filter layer have sizes in a range of 3 nm to 3.5 nm, the quantum dots in the green region (G) of the color filter layer have sizes in a range of 2 nm to 3 nm, and the quantum dots in the blue region (B) of the color filter layer have sizes in a range of 1.5 nm to 2 nm.

3. The color filter substrate according to claim 1, wherein the color filter layer further comprises a coloring agent, an adhesive & cross-linking agent, a solvent and a photopolymerization initiator.

4. The color filter substrate according to claim 1, wherein the core of the quantum dots is made of cadmium selenide and the shell of the quantum dots is made of cadmium sulfide, the quantum dots in the red region of the color filter layer have sizes in a range of 3.2 nm to 3.9 nm, the quantum dots in the green region of the color filter layer have sizes in a range of 2.2 nm to 3.2 nm, and the quantum dots in the blue region of the color filter layer have sizes in a range of 1.7 nm to 2.2 nm.

5. The color filter substrate according to claim 1, wherein the quantum dots are core-shell type quantum dots with a dual shell structure, each of the quantum dots has a core, an inner shell and an outer shell, the core is made of cadmium selenide, the inner shell is made of cadmium sulfide and the outer shell is made of zinc sulfide, the quantum dots in the red region of the color filter layer have sizes in a range of 4.3 nm to 4.9 nm, the quantum dots in the green region of the color filter layer have sizes in a range of 3.3 nm to 4.3 nm, and the quantum dots in the blue region of the color filter layer have sizes in a range of 2.8 nm to 3.3 nm.

6. A display panel, comprising the color filter substrate according to claim 1.

7. A display device, comprising the display panel according to claim 6.

* * * * *